INVENTORS.
JAMES C. HAMMONDS
ROY R. DARE

BY *Samuel J Snyder*

ATTORNEY

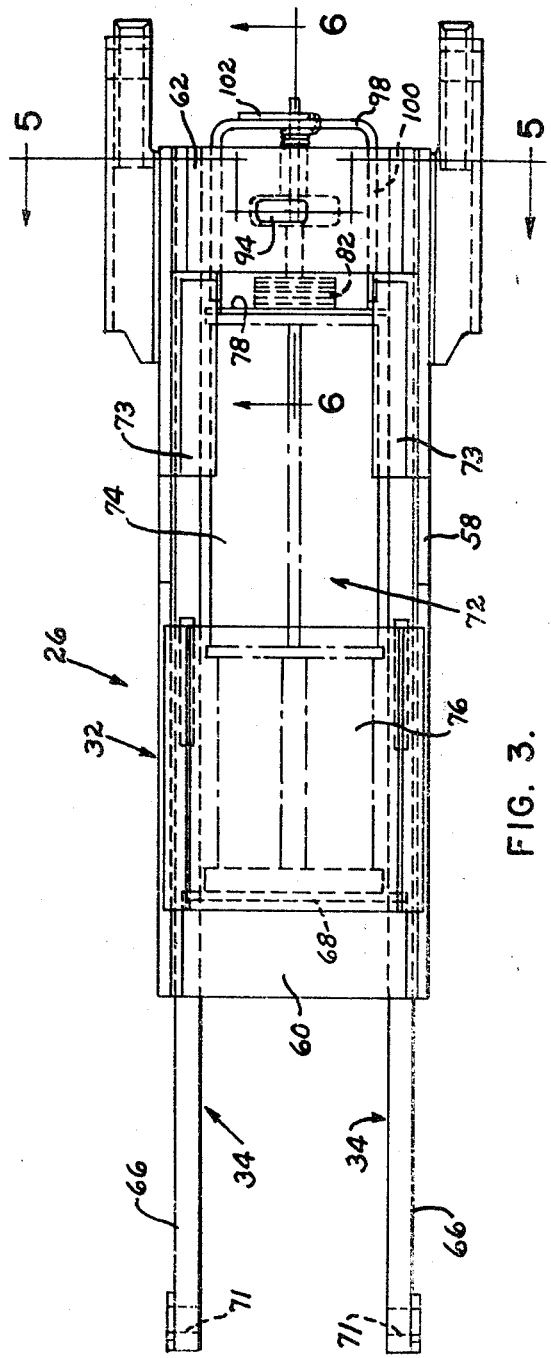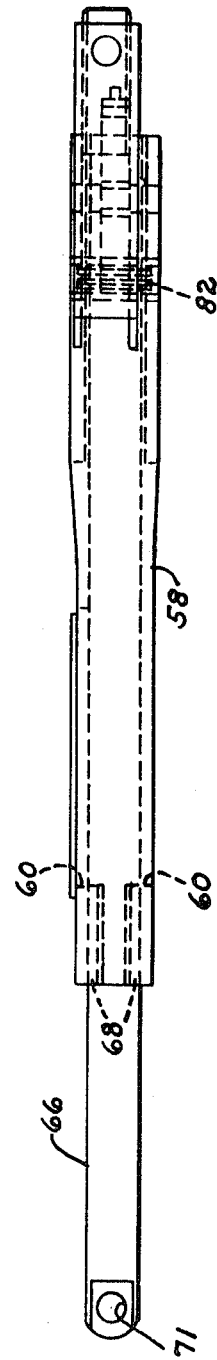

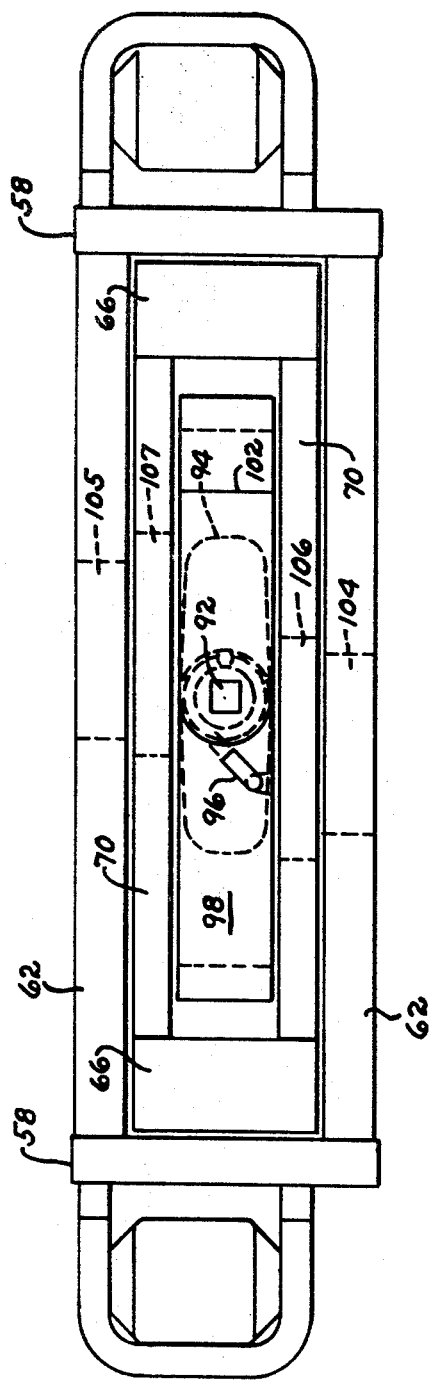
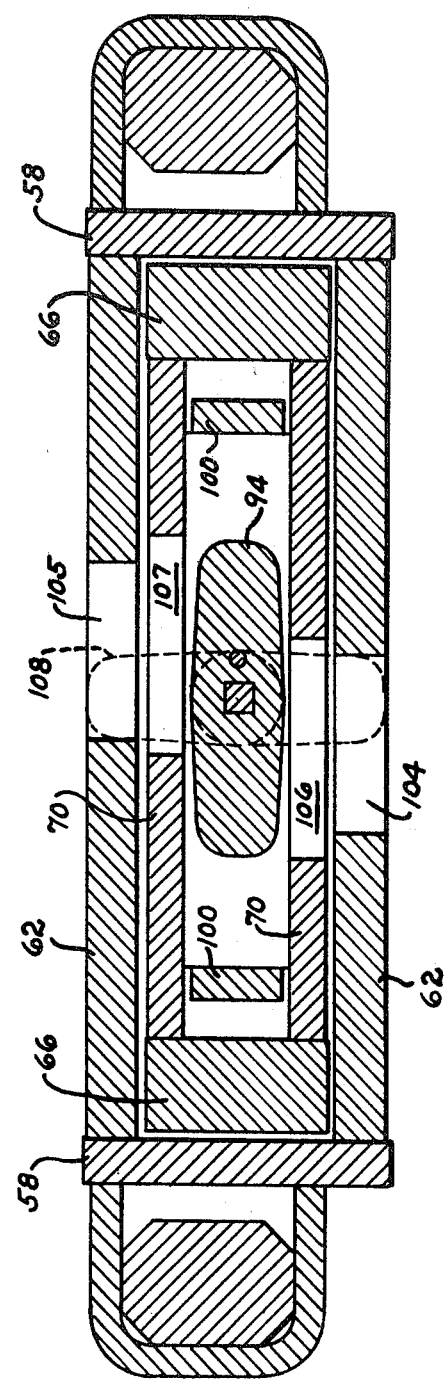

United States Patent Office 3,606,219
Patented Sept. 20, 1971

3,606,219
RAILWAY CAR TRAILER HITCH HAVING A SAFETY LOCK
James C. Hammonds and Roy R. Dare, St. Charles, Mo., assignors to ACF Industries, Incorporated, New York, N.Y.
Filed Apr. 21, 1970, Ser. No. 30,477
Int. Cl. B60p 7/06; B61d 3/16
U.S. Cl. 248—119S                                7 Claims

ABSTRACT OF THE DISCLOSURE

A railway car trailer hitch with oleo-pneumatic cushions in a telescoping diagonal strut includes safety means for preventing the hitch from failing to support the trailer, or to hold it securely, upon a loss of cushioning pressure. The safety means includes a locking bar adapted to be released by Belleville washers to lock the diagonal strut in a normally extended position when the cushion pressure falls below a safe value. The Belleville washers are encased in a housing which prevents the normally occurring variations of cushions force from being applied to the washers, thus reducing fatigue of the washers.

BACKGROUND OF THE INVENTION

This invention is particularly concerned with cushioned trailer hitch structures for railway cars which are employed to secure a vehicle trailer or the like to a railway flat car for transporting the vehicle by rail. A cushioned railway trailer hitch may become worn or damaged to the extent that the cushioning ability of the hitch structure is severely reduced or rendered inoperative. In an oleo-pneumatic cushion this fault may result from a gas pressure drop. A defective cushioning unit structure may allow the trailer hitch to freely oscillate between its maximum limits, thereby allowing the vehicle trailer to move freely on the railway car. When this occurs, shock forces applied to the vehicle trailer may damage the trailer or its cargo, or even cause the trailer to break away from the hitch.

To prevent such damage, safety means for rendering the diagonal strut rigid upon a failure of cushioning have been proposed in Pat. No. 3,490,723 and application Ser. No. 782,674, filed Dec. 10, 1968, by James C. Hammonds, both of which are assigned to the assignee of this application. The object of this invention is to provide safety apparatus having greater reliability than previously proposed arrangements.

SUMMARY OF THE INVENTION

The invention consists of a trailer supporting hitch mounted on a railway car. The hitch has a pivoted upright strut, to the top of which is pivoted a fifth wheel plate for receiving the trailer kingpin, and a diagonal strut pivoted to the upright strut at one end and to the car at the other end. The diagonal strut has a pair of oleo-pneumatic cushions, containing gas under very high pressures. Means are connected to one of the struts for moving it along the deck of the car to raise and lower the hitch. The diagonal strut includes upper and lower telescoping members held in extended positions so as to hold the upright strut substantially vertical. A stack of Belleville washers acts against the cushions and normally is overbalanced by the force of the cushions. The Belleville washers are encased in a housing so that the portion of the cushion force in excess of the overbalancing force is applied to the housing directly and not to the washers. When the cushion force falls below the overbalancing level, a stop is removed which allows a torsion spring to turn a locking bar so that it locks the upper and lower numbers of the diagonal against relative movement. The hitch, therefore, can remain erect and safely support and hold a trailer.

BRIEF DESCRIPTION OF THE DRAWING

The drawing of this application includes the following figures:

FIG. 3 is a top plan of the diagonal strut.
FIG. 4 is a side view of the diagonal strut.
FIG. 5 is a section taken along line 5—5 of FIG. 3.
FIG. 7 is a view of the lower end of the strut.

DESCRIPTION OF THE PREFERRED EMBODIMENTS

Figure 1:
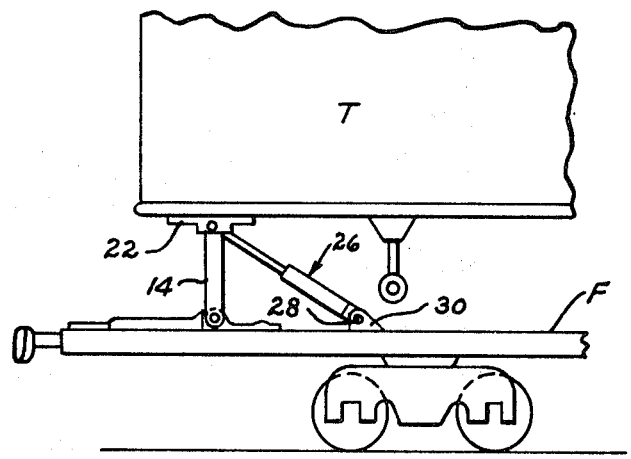
FIG. 1 is a partial side elevation of an end of a railway flat car having the trailer hitch securing a trailer thereon.
Figure 2:
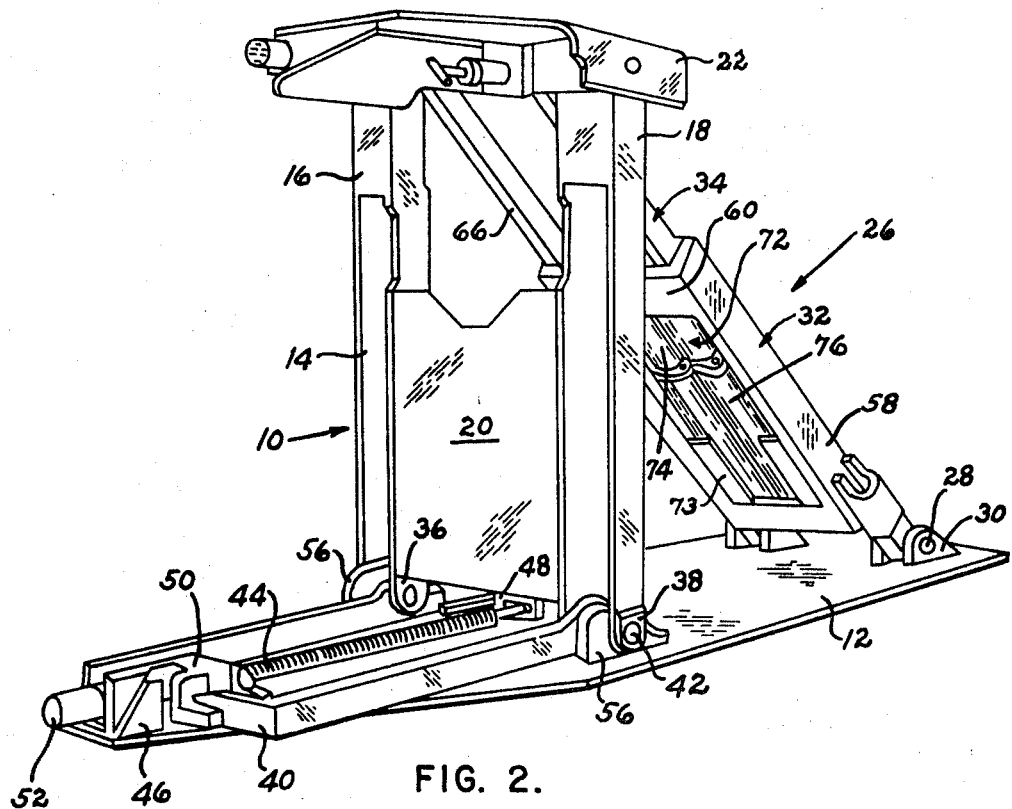
FIG. 2 is a perspective of the trailer hitch of FIG. 1 shown removed from the railway flat car.

With reference now to the drawings, FIGS. 1 and 2 illustrate a trailer hitch or support device 10 for the fifth wheel of a semi-trailer T to be transported by a railway flat car F. The trailer hitch structure 10 is similar to that of Pat. No. 3,490,723, having plate 12 which is fixed to the deck of the railway flat car. The trailer hitch structure includes a vertical strut 14, including a pair of parallel legs 16 and 18 which are interconnected by means of a brace plate 20 or other similar bracing structure. A fifth wheel support structure 22 is connected by means of a pivot to the upper extremity of the legs 16 and 18, and is adapted to pivot from a position substantially normal to the vertical strut 14 in the upright position of the hitch as shown in FIG. 1 to a position substantially parallel to the vertical strut 14 in the collapsed position of the hitch 10.

The trailer hitch is provided with a diagonal strut or leg shown generally at 26, which is pivotally connected to the upper extremity of the vertical strut 14 and has its lower extremity connected by means of a pivot 28 to a lug 30, which is welded to the base plate 12. The diagonal leg 26 is constructed in the form of a telescoping frame including an outer frame 32 which receives an inner frame 34 in telescoping relation therein. The specific construction of the diagonal leg 26 and its operative relationship with the structural elements of the trailer hitch 10 will be set forth in detail hereinbelow.

Each of the vertical parallel legs 16 and 18 of the vertical strut 14 is bifurcated at its lower extremity defining inner and outer clevis plates 36 and 38 respectively. A horizontal operating frame 40 is connected by means of pivots 42 to the inner clevis plates 36 thereby establishing pivotal connection between the horizontal frame and the vertical strut 14. An operating screw 44 for raising and lowering hitch 10 between its operative and stored or collapsed positions is retained in parallel relation with the base plate 12 by bearing structures 46 and 48. The operating screw 44 is provided with drive threads and is threadingly received within an internally threaded frame drive assembly 50 carried by the operating frame 40, as disclosed in Pat. No. 3,145,006. The operating screw 44 is provided at its outer extremity with drive connection 52 for connecting to manual or mechanical means for imparting rotation to the operating screw.

In the erect position of hitch 10 illustrated in FIG. 1, pivot pins 42 are maintained in engagement with abutment lugs 56, which are fixed to base plate 12 by welding or the like. In this position of the hitch, pivot pins 42 form a substantially fixed pivot for the lower extremities of the vertical supports. To lower the trailer hitch to its stored or collapsed position, operating screw 44 is rotated in a direction driving the operating frame 40 rearwardly toward the lugs 30. The operating frame 40, by virtue of its connection with the vertical support, will force the lower portion of the vertical strut 14 rearwardly, thereby causing the vertical support to be lowered to a position on the base plate 12 or on the deck of the railway car. At the same time, the fifth wheel support will pivot to a position substantially parallel with the vertical strut 14 and will be lowered with the vertical strut until it rests flat on or adjacent to the deck of the railway car.

With reference now to FIGS. 2, 3, and 4, the diagonal leg 26 comprises a pair of parallel outer rails 58 having transverse brace plates 60 and 62 fixed therebetween to maintain the rails 58 in substantially parallel relationship and defining a generally rectangular parallelogram. The inner frame 34, which comprises a pair of substantially parallel rails 66, having upper transverse brace plates 68 and lower brace plates 70, is received in telescoping relationship within the outer frame 32. The lower extremity of outer frame 32 is connected to the pivot lug 30 by the pivot pin 28. The upper pivot pin connecting the fifth wheel support to the vertical support is also received within pivot apertures 71 formed at the extremity of the inner frame 34, thereby pivotally connecting the upper portion of the diagonal leg to the fifth wheel support assembly 22 and the vertical support 14. The parallelogram structure defined by the outer frame 32 and the inner frame 34 interfit to define a generally rectangular opening in which is disposed a cushioning unit assembly illustrated generally at 72.

The cushioning unit assembly 72 comprises a pair of oleo-pneumatic cushioning units shown generally at 74 and 76 which are disposed in generally parallel relationship. The cushioning unit assembly 72 is provided at its lower extremity with a guide plate 78 which is received between the inner rails 66, and which retains the lower portion of the cushioning unit in assembly within the diagonal leg structure. Cup shaped housing 80 normally abuts guide plate 78 on its upper side and transverse plates 62 and 70 on its lower side. Upper and lower pairs of fillet members 73 are fixed to the outer frame 32 by welding or the like and serve to prevent lateral misalignment of the cushioning units.

It is apparent that cushioning unit 72 is compressed to dissipate energy regardless of the direction of impact which is transmitted to the diagonal leg of the hitch. If impact forces cause the vertical support 14 to be rotated rearwardly about the pivot 42, inner frame 34 will be telescoped into outer frame 32. When this occurs, transverse support plates 68, being rigid with the inner frame 34, will force the upper portion of cushioning unit assembly 72 downwardly. Under this condition, the lower transverse support plates of inner frame 34 will move away from housing 80, but housing 80 will be maintained in abutment with the transverse plate 62 of the outer frame 32, thereby causing cushioning unit 72 to become compressed.

If impact forces on the trailer cause the vertical support to rotate forwardly about its pivot, the inner frame moves outwardly with regard to the outer frame. The transverse plates 68 will then move out of abutment with the upper guide plate 68, and transverse plates 60 of the outer frame 32 will prevent upward movement of the uppermost portion of the cushioning unit assembly. The lower transverse plates 70, however, will move the lower guide plate 78 out of abutment with the transverse plates 62, thereby causing compression of the cushioning unit assembly. Thus, impact loads from either direction causing either forward or rearward pivoting of the vertical strut 14 will result in compression of the cushioning unit assembly and dissipation of energy.

A spring, preferably in the form of a stack of Belleville washers 82, is normally compressed so that plate 78 engages housing 80. The housing abuts transvers plates 62 and 70 and thus provides a stop for plate 78 and the cushions, and limits the possible compression of spring 82. Bar 84 is affixed to guide plate 78. Shaft 86 has a U-shaped end 88 adapted to span bar 84 under normal conditions. Shaft 86 extends through opening 90 in housing 80 and has a reduced square portion 92 which carries locking bar 94 and torsion spring 96. The ends of spring 96 engage locking bar 94 and yoke 98, the arms 100 of which are fixed to housing 80. Arm 102 indicates the position of locking bar 94.

Figure 6:
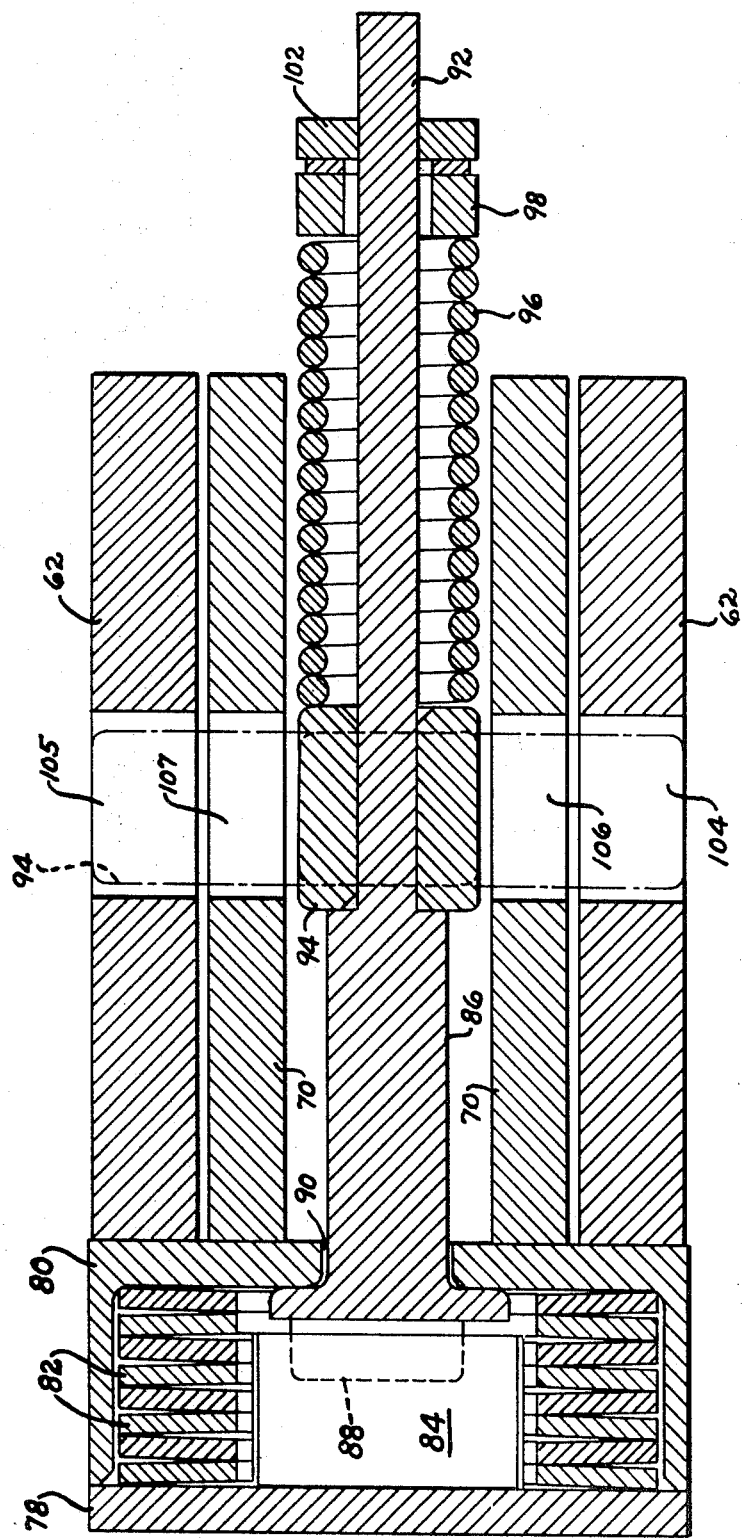
FIG. 6 is a section taken along line 6—6 of FIG. 3.
Figure 8:
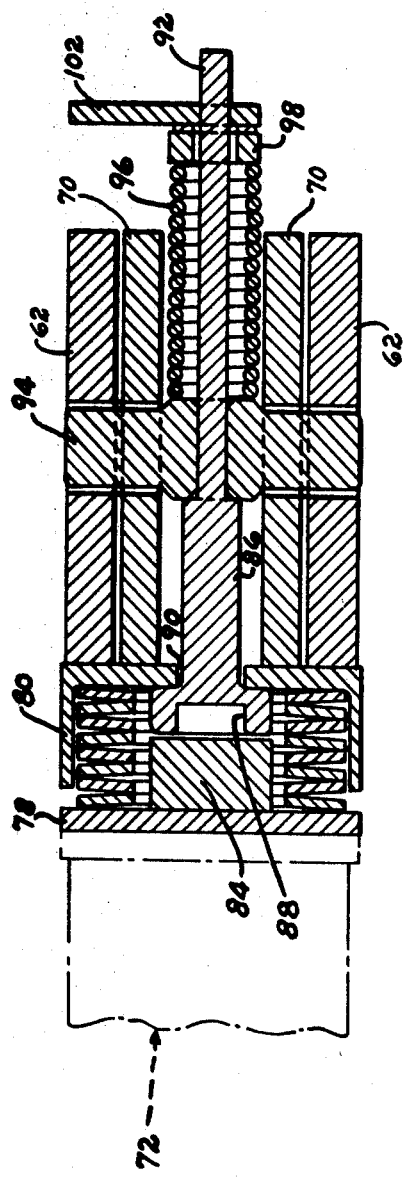
FIG. 8 is a view similar to that of FIG. 6 but showing the locking means in the actuated condition.

The locking mechanism operates in the following manner: If cushions 74, 76 lose their pressure to such an extent that Belleville washers 82 expand and push plate 78 away from housing 80, as shown in FIG. 8, then bar 84 is drawn out of the recess of U-shaped member 88. If diagonal strut 26 is in its neutral position, or when it returns to its neutral position, shaft 86 can be turned by spring 96 so that locking bar 94 moves into slots 104–107, as shown in FIG. 6, and indicated by dotted lines 108 in FIG. 5. Portions 32 and 34 of diagonal strut 26 are then locked together and the strut remains rigid. The hitch is then capable of supporting and holding a trailer on a railway car. The defective cushioning means are locked out, but otherwise the hitch remains effective and operable.

As long as cushions 74, 76 have a sufficient pressure, plate 78 closes housing 80 and Belleville washers 82 do not expand or compress as the pressure of cushions 74, 76 changes during normal operation. Since the washers are not subjected to varying stresses, they have a long fatigue life. The support of both ends of shaft 86 on housing 80 prevents appreciable misalignment of the locking mechanism.

What is claimed is:

1. A collapsible hitch for supporting a trailer on a railway car comprising a diagonal strut including two longitudinally displaced strut members slidable relative to each other end resilient cushioning means for normally holding said members displaced and for cushioning relative movement between said members, spring means interposed between one end of said cushioning means and said strut members, stop means for limiting the forces applied to said spring means to a predetermined force which is less than normal cushioning forces, releasable means for interlocking said members to render said diagonal strut rigid, and means actuated by said spring means for releasing the interlocking means in response to a predetermined loss of cushioning force.

2. Apparatus according to claim 1, wherein said cushioning means are oleo-pneumatic cushion means, said stop means including a recessed housing and a cover plate extending across the open end of said housing, said housing and said plate being interposed between said cushioning means and end portions of said strut members, said spring means being located in said housing and acting against said plate to move it longitudinally away from said housing when said cushioning means has a predetermined loss of pressure.

3. Apparatus according to claim 2 wherein said spring means is a group of Belleville washers.

4. Apparatus according to claim 2 wherein said means for interlocking said strut members includes a shaft, a locking bar fixed to said shaft and extending radially therefrom, a torsion spring for rotating said shaft, said strut members having juxtaposed slots to receive said locking bar, whereby said locking bar is turned into said slots when released.

5. Apparatus according to claim 4, including means for supporting said shaft on said housing.

6. Apparatus according to claim 5, wherein said plate on said housing has a projection extending into said housing and said shaft has a portion engaging said projection for preventing rotation of said shaft until said projection is moved out of engagement therewith by said spring means.

7. In a collapsible hitch for supporting a trailer on a railway car comprising a diagonal strut pivoted at its lower end to the deck of the car and including two longitudinally displaced telescoping and pressurized pneumatic cushioning means for normally holding said strut members displaced and for cushioning relative movement between said members, the improvement consisting of safety means comprising spring means interposed between one end of said cushioning means and said strut members; means for preventing the application to said spring means of normal variations of the cushioning forces; releaseable means for interlocking said strut members to render said diagonal strut rigid; and means actuated by said spring means for releasing the interlocking means in response to a predetermined loss of cushioning force, whereby the hitch is made capable of supporting the trailer during a failure of the cushioning means.

References Cited

UNITED STATES PATENTS

| | | | |
|---|---|---|---|
| 3,142,466 | 7/1964 | Gutridge | 105—368SX |
| 3,235,211 | 2/1966 | Robinson et al. | 248—119S |
| 3,246,866 | 4/1966 | Price et al. | 248—119S |
| 3,337,170 | 8/1967 | Remy et al. | 248—119S |
| 3,490,723 | 1/1970 | Atkinson | 248—119S |
| 3,544,050 | 12/1970 | Hammonds | 105—368SX |

J. FRANKLIN FOSS, Primary Examiner

U.S. Cl. X.R.

105—368S